(12) United States Patent
Lee (10) Patent No.: US 7,760,419 B2
(45) Date of Patent: Jul. 20, 2010

(54) ELECTROPHORETIC DISPLAY DEVICE

(75) Inventor: Jong Kwon Lee, Anyang-si (KR)

(73) Assignee: LG. Display Co., Ltd., Seoul (KR)

( * ) Notice: Subject to any disclaimer, the term of this patent is extended or adjusted under 35 U.S.C. 154(b) by 0 days.

(21) Appl. No.: 12/338,135

(22) Filed: Dec. 18, 2008

(65) Prior Publication Data
US 2010/0085628 A1      Apr. 8, 2010

(30) Foreign Application Priority Data
Oct. 7, 2008     (KR) ............... 10-2008-0098082

(51) Int. Cl.
G02B 7/02          (2006.01)
(52) U.S. Cl. ............... 359/296; 359/290; 345/107
(58) Field of Classification Search ........... 359/296, 359/290, 291, 238; 345/84, 85, 107
See application file for complete search history.

(56) References Cited

U.S. PATENT DOCUMENTS

| 6,762,744 | B2 * | 7/2004 | Katase ................. 345/107 |
| 6,919,003 | B2 * | 7/2005 | Ikeda et al. ............ 204/490 |
| 2004/0071417 | A1 * | 4/2004 | Veligdan ............... 385/120 |
| 2005/0111075 | A1 * | 5/2005 | Kaneko et al. ........ 359/296 |
| 2006/0066558 | A1 * | 3/2006 | Zhou et al. ............ 345/107 |
| 2009/0179923 | A1 * | 7/2009 | Amundson et al. ..... 345/690 |

* cited by examiner

Primary Examiner—Timothy J Thompson
(74) Attorney, Agent, or Firm—Brinks Hofer Gilson & Lione (57) ABSTRACT

An configurationally simplified electrophoretic display device is disclosed. The electrophoretic display device includes a substrate including a plurality of pixels, first pixel electrodes on the substrate, second pixel electrodes to be slit on each first electrode, and an electrophoretic film disposed on the second pixel electrodes. The second pixel electrodes are slit in different widths according to a plurality of subpixels.

8 Claims, 6 Drawing Sheets

ELECTROPHORETIC DISPLAY DEVICE

RELATED APPLICATIONS

This application claims priority under 35 U.S.C. 119 to Korean Patent Application No. 10-2008-0098082, filed on Oct. 7, 2008, which is hereby incorporated by reference in its entirety.

BACKGROUND

1. Field of the Disclosure

This disclosure relates to an electrophoretic display device, and more particularly to a configurationally simplified electrophoretic display device.

2. Description of the Related Art

Nowadays, flexible display devices have been developed which do not damage upon folding or rolling. These flexible display devices include the existing flat display devices, such as pliable LCD (liquid crystal display) and OLED (organic electro-luminescent display) devices, as well as electro-paper devices such as electrophoretic display devices.

Among these flexible display devices, the electrophoretic display device uses an electrophoresis phenomenon which allows charged particles (or leptons) to move toward an anode electrode or a cathode electrode within an electric field. This eliminates the necessity of an internal light source. In other words, the electrophoretic display device may be a reflective display device which drives electrophoretic suspension particles (or leptons) using transparent conductive films coated on flexible thin base films such as a metal film or a plastic sheet. As such, the electrophoretic display device has features such as a reflectivity corresponding to paper, a superior readability based on a wide viewing angle, good pliability and portability, is slim, and has a light-weight size. In view of this, the electrophoretic display device has received a growing amount of attention as a next-generation display device and as an electro-paper.

Figure 1:
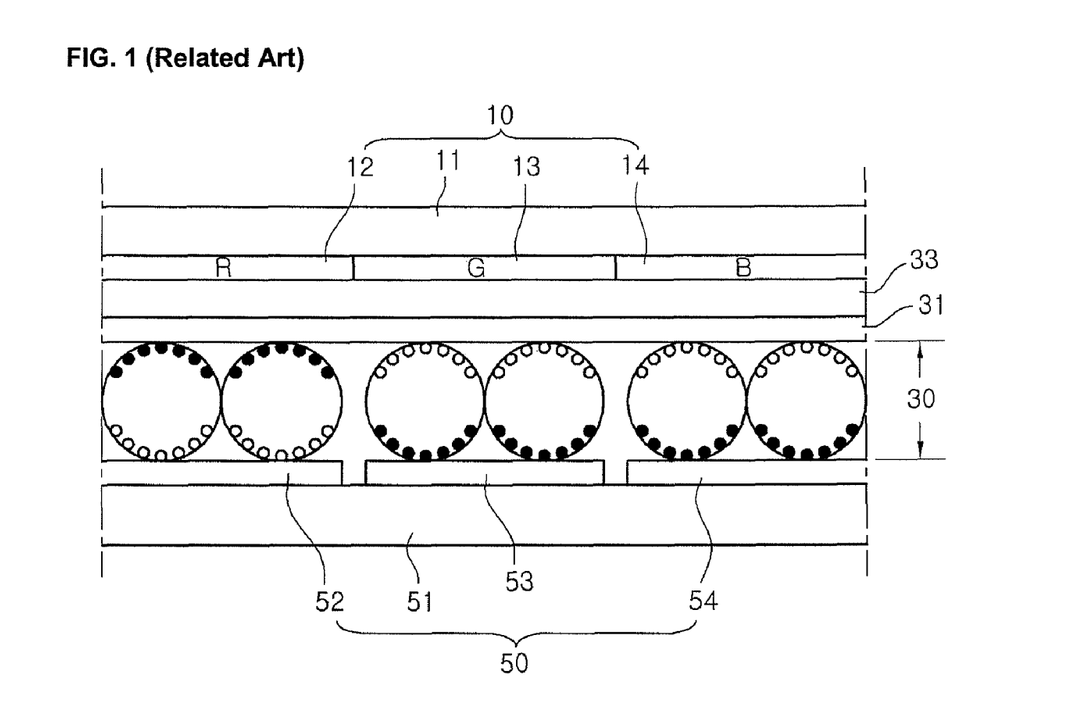
FIG. 1 is a cross-sectional view showing one pixel included in an electrophoretic display device of related art.

FIG. 1 is a cross-sectional view showing one pixel included in an electrophoretic display device of related art. As shown in FIG. 1, the electrophoretic display device includes an electrophoretic film 30, an insulation film 33, and an upper substrate 10 sequentially stacked on a lower substrate 50. The lower substrate 50 includes a first base substrate 51 and lower electrodes 52 to 54 formed on the first base substrate 51. The insulation film 33 includes a common electrode 31 formed on its lower surface. The upper substrate 10 includes a second base substrate 11 and red, green, and blue color filters 12 to 14 formed on the second base substrate 11. The electrophoretic film 30 includes a polymer containing electronic ink capsules. Each electronic ink capsule consists of white ink and black ink.

Such an electrophoretic display device applies an arbitrary polarity voltage to the lower electrodes 52 to 54 on the lower substrate 50 and a common voltage to the common electrode 31. In accordance therewith, the white ink and the black ink are separated from each other by an electric field between the lower electrodes 52 to 54 and the common electrode 31.

If a negative polarity voltage is applied to the lower electrodes 52 to 54, the common voltage on the common electrode 31 becomes a positively-charged electric potential opposite to the negative polarity voltage. Then, the positively-charged white ink moves toward the lower substrate 50, while the negatively-charged black ink moves toward the upper substrate 10.

In contrast, when a positive polarity voltage is applied to the lower electrodes 52 to 54, the common voltage on the common electrode 31 becomes a negatively-charged electric potential opposite to the positive polarity voltage. In this case, the negatively-charged white ink moves toward the upper substrate 10, while the positively-charged black ink moves toward the lower substrate 50.

In this way, the electrophoretic display device moves the white ink toward the upper substrate 10 by applying the positive polarity voltage to the lower electrodes 52 to 54 and the moved white ink is able to reflect light from the exterior toward the upper substrate 10. The reflected light restrictively transmits the upper substrate 10 loaded with the color filters 12 to 14, thereby displaying a color image.

However, the combination of the electrophoretic film 30 and the upper substrate 10 with the lower substrate 50 (on which the lower electrodes 52 to 54 and the thin film transistors are formed) frequently generates an alignment defect in the electrophoretic display device of the related art. Also, since the incident light from the exterior via the color filter 12 to 14 passes through the color filter 12 to 14 again, the reflectivity of external light decreases due to a light leakage. Moreover, in the electrophoretic display device of the related art, the color characteristics of the color filters 12 to 14 deteriorate because of the heat-resistant quality of an adhesive used for combination.

BRIEF SUMMARY

An electrophoretic display device includes: a substrate including a plurality of pixels; first pixel electrodes formed on the substrate; second pixel electrodes formed to be slit on each first electrode; and an electrophoretic film disposed on the second pixel electrodes, wherein the second pixel electrodes are slit in different widths according to a plurality of sub-pixels.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION OF THE DRAWINGS AND THE PRESENTLY PREFERRED EMBODIMENTS

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
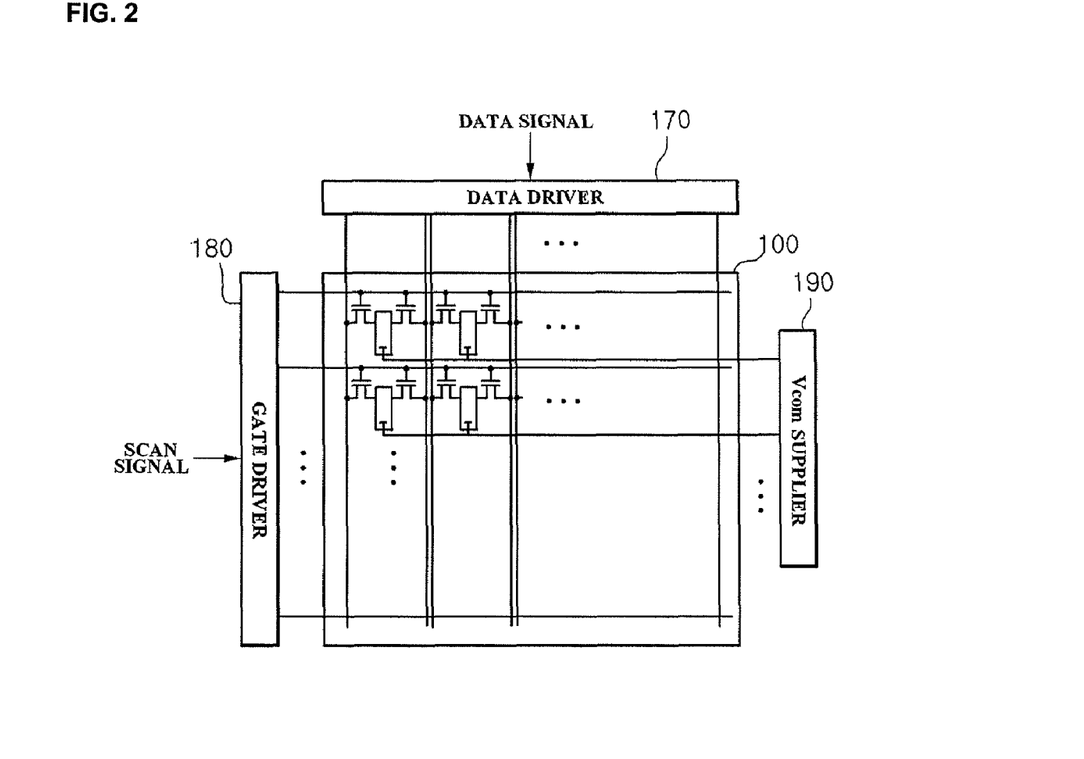
FIG. 2 is a schematic diagram showing the configuration of an electrophoretic display device according to an embodiment of the present disclosure.
Figure 3:
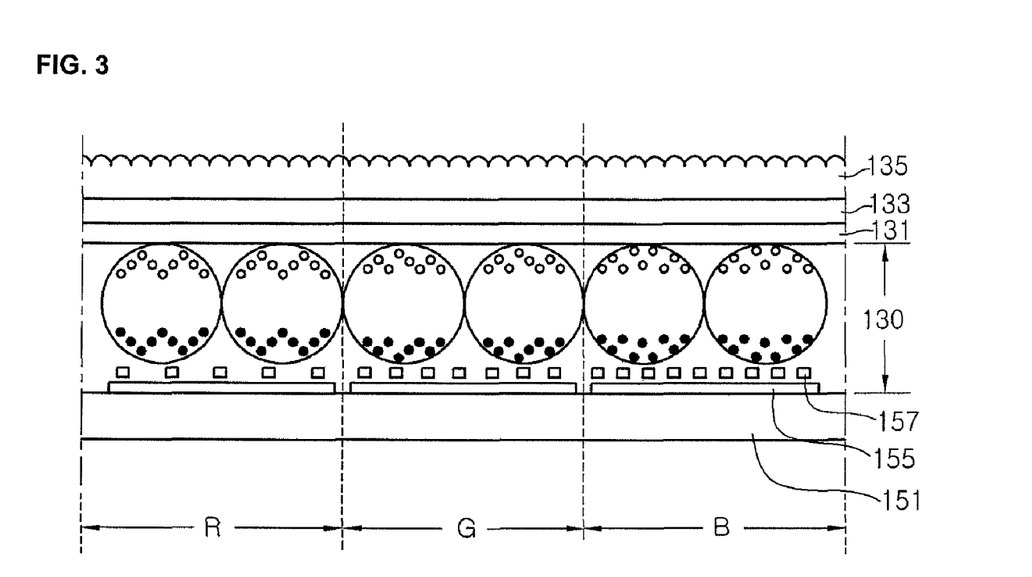
FIG. 3 is a cross-sectional view showing one pixel within the electrophoretic display panel in FIG. 2.

FIG. 2 is a schematic diagram showing the configuration of an electrophoretic display device according to an embodiment of the present disclosure. FIG. 3 is a cross-sectional view showing one pixel within the electrophoretic display panel in FIG. 2.

Referring to FIGS. 2 and 3, an electrophoretic display device according to an embodiment of the present disclosure includes an electrophoretic display panel 100, a gate driver 180, a data driver 170, and a common voltage supplier 190. The electrophoretic display device 100 includes thin film transistors TFT which are formed two to every pixel. The gate driver 180 provides scan pulse signals which turn on the thin film transistors TFT. The data driver 170 applies a positive or negative polarity voltage to first and second electrodes 155 and 157 included in each pixel. The common voltage supplier 190 applies a common voltage to a common electrode 131.

The gate driver 180 is connected to the gate electrodes of the thin film transistors TFT through a plurality of gate lines on the electrophoretic display panel 100. Also, the gate driver 180 responds to a scan signal from the exterior and applies sequential scan signals to the electrophoretic display panel 100. These sequential scan signals sequentially turn on the thin film transistors TFT by lines.

Similarly, the data driver 170 is connected to the source electrodes of the plural thin film transistor pairs TFT through a plurality of data line pairs on the electrophoretic display panel 100. Also, the data driver 170 applies data voltages to the first and second electrodes 155 and 157 of each pixel on the electrophoretic display device when the thin film transistor pair TFT are turned on.

The electrophoretic display panel 100 includes a plurality of pixels each of which consists of plural sub-pixels. This electrophoretic display panel 100 will be explained referring to FIG. 3, which shows only one among the many pixels included therein.

The electrophoretic display panel 100 includes a lower substrate 151 on which first and second pixel electrodes 155 and 157 are sequentially formed. The electrophoretic display panel 100 further includes an electrophoretic film 130, an insulation film 133, and a light correction film 135 sequentially stacked on the lower substrate 151. The lower substrate 151 may be of a base film. The insulation film 133 includes a common electrode 131 formed on its lower surface. The light correction film 135 changes the path of light.

One pixel includes 3 sub-pixels capable of displaying red, green, and blue lights (dots). In each sub-pixel, two thin film transistors TFT (not shown) are formed.

The first electrode 155 is formed in a flat shape on each of the red, green, and blue sub-pixels R, G, and B of the lower substrate 100.

The second electrode 157 is formed on the first electrode 155 to have a plurality of slits. The slits of the second electrodes 157 on the red, green, and blue sub-pixels are different from each other in width. More specifically, the slit width of the second electrode on the red sub-pixel is wider than that of the second electrode on the green sub-pixel, and the slit width of the second electrode 157 on the green sub-pixel is wider than that of the second electrode on the blue sub-pixel.

The light correction film 135 is disposed on the insulation film 133 having the common electrode 131 thereon. When an image is displayed through the reflection of external light by the electrophoretic display panel 100, the light correction film 135 changes the path of light transmitted through it, thereby improving the viewing angle.

In this manner, as the second pixel electrodes 157 on the red, green, blue sub-pixels are formed to have slits different from one another in width, the electrophoretic display device according to the embodiment of the present disclosure can display a color of any desired gray scale level. To this end, the electrophoretic display device may apply a constant positive or negative polarity voltage to the second pixel electrodes 157 and may control the pulse widths of data signals applied to the first pixel electrodes 155.

More specifically, the first pixel electrode 155 and the slit second pixel electrode 157 force the ink particles (or leptons) to be arranged in a grating (i.e., a diffraction grating) shape. As such, the electrophoretic display device allows light of a specific wavelength band from the incident exterior light to be reflected toward the light correction film 135, thereby displaying a color (or a color image on the electrophoretic display panel 100). Although it is not described in detail in the electrophoretic display device according the embodiment of the present disclosure, the gap between the first and second pixel electrodes 155 and 157 and the slit width of the second pixel electrode 157 can be adjusted in order to control the wavelength band of reflected light and the gray scale level of reflected light.

Figure 4:
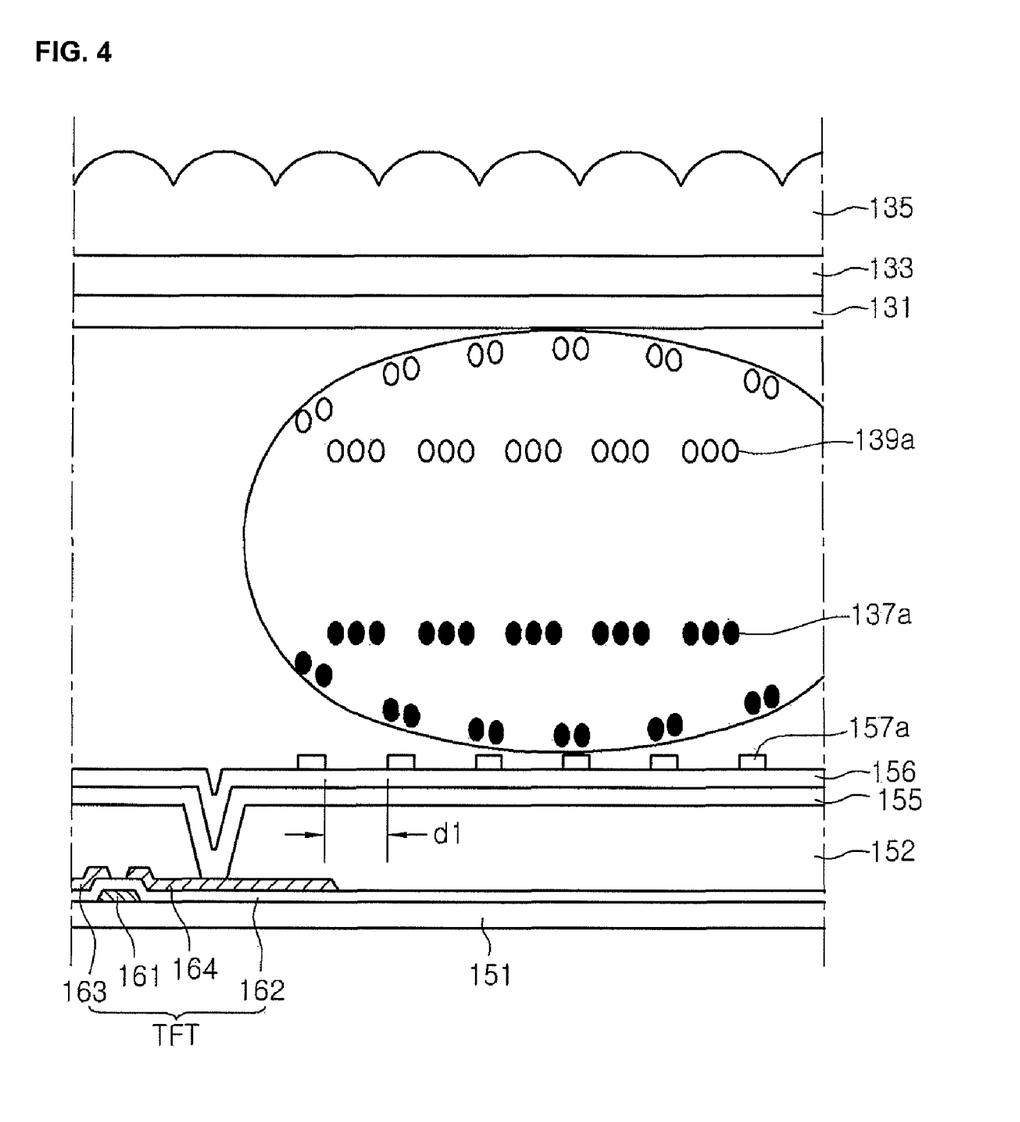
FIG. 4 is a cross-sectional view showing a red sub-pixel according to an embodiment of the present disclosure.

FIG. 4 is a cross-sectional view showing a red sub-pixel according to an embodiment of the present disclosure. As shown in FIG. 4, the red sub-pixel R includes an electrophoretic film 130, an insulation film 133, and a light correction film 135 sequentially stacked on the lower substrate. The lower substrate includes a base film 151 on which two thin film transistors TFT are formed. A common electrode 131 is formed on the insulation film 133. The light correction film 135 changes light paths.

The lower substrate includes a gate electrode 161 formed on the base film 151. The base film 151 includes a gate insulation film 162 formed on its entire surface including the gate electrode 161. Also, source/drain electrodes 163 and 164 are formed on the gate insulation film 162.

There is a protective film formed on the gate insulation film 162 including the source/drain electrodes 163 and 164, and the first pixel electrode 155 is formed on the protective film 162. The first pixel electrode 155 is formed to be electrically connected with the drain electrode 164 of the thin film transistor TFT. Although it is not shown in the drawing, a semiconductor pattern is formed between the gate insulation film 162 and the source/drain electrodes 163 and 164.

Another insulation film 156 is formed on the protective film including the first pixel electrode 155, and a second pixel electrode 157a of slit structure (or slit shape) is formed on this additional insulation film 156. The second pixel electrode 157a is electrically connected to the drain electrode of another thin film transistor TFT (not shown). In other words, one sub-pixel (i.e., the red sub-pixel R) may include two thin film transistors TFT. The thin film transistor TFT connected to the first pixel electrode 155 is turned on and off simultaneously with another thin film transistor TFT connected to the second pixel electrode 157a. This other thin film transistor TFT connected to the second pixel electrode 157a is formed simultaneously with the thin film transistor TFT connected to the first pixel electrode 155.

The electrophoretic film 130 includes a polymer and electronic ink capsules 137a and 139a within the polymer. The electronic ink within one capsule includes black ink 137 and white ink 139a. The black ink particles 137a and the white ink particles 139a are arranged (or distributed) in the grating (the diffraction grating) shape, as shown in FIG. 4. This results from the fact that in the center of the common voltage on the common electrode 131, the electric potential difference on a region occupied with only first pixel electrode 155 is different from that on another region occupied with the stacked first and second pixel electrodes 155 and 157.

The common electrode 131 formed on a surface (i.e., the lower surface) of the insulation film 133 is opposite the electrophoretic film 130. The light correction film 135 disposed on the other surface (i.e., the upper surface) of the insulation film 133 includes an embossed pattern formed on its upper surface.

In this way, the red sub-pixel of FIG. 4 includes the second pixel electrode 157a which is formed to be slit in a first width d1 on the first pixel electrode 155. In accordance therewith, the red sub-pixel of FIG. 4 as described above can reflect only light of a fixed wavelength band (i.e., a red light) when a pulse-width-modulated data voltage and a constant positive or negative polarity voltage are applied to the first and second pixel electrodes 155 and 157a.

Figure 5:
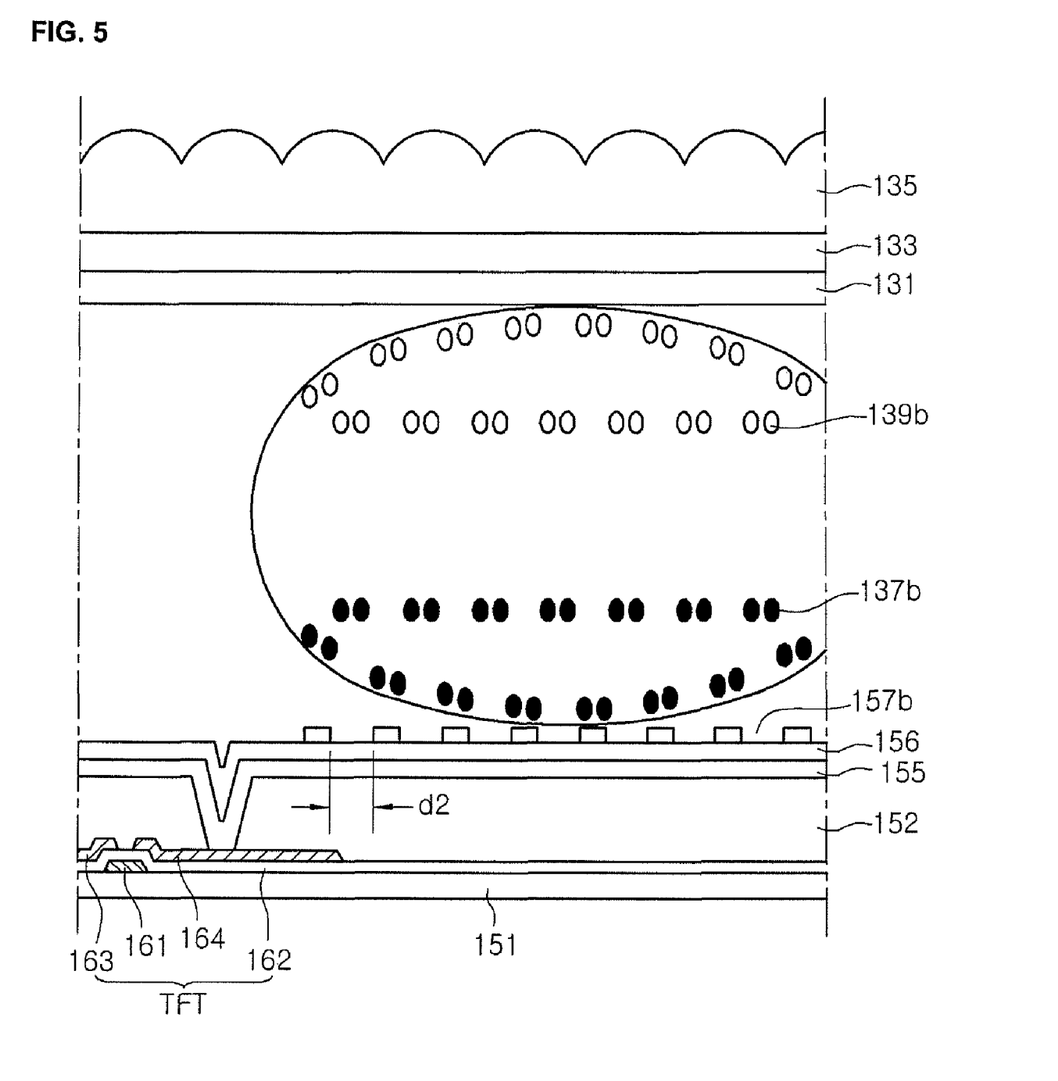
FIG. 5 is a cross-sectional view showing a green sub-pixel according to an embodiment of the present disclosure.

FIG. 5 is a cross-sectional view showing a green sub-pixel according to an embodiment of the present disclosure. Referring to FIG. 5, the green sub-pixel G includes an electrophoretic film 130, an insulation film 133, and a light correction film 135 sequentially stacked on the lower substrate. The lower substrate includes a base film 151 on which two thin film transistors TFT are formed. A common electrode 131 is formed on the insulation film 133. The light correction film 135 changes light paths.

The lower substrate includes a gate electrode 161 formed on the base film 151. The base film 151 includes a gate insulation film 162 formed on its entire surface including the gate electrode 161. Also, source/drain electrodes 163 and 164 are formed on the gate insulation film 162.

There is a protective film 152 formed on the gate insulation film 162 including the source/drain electrodes 163 and 164, and the first pixel electrode 155 is formed on the protective film 152. The first pixel electrode 155 is formed to be electrically connected with the drain electrode 164 of the thin film transistor TFT. Although it is not shown in the drawing, a semiconductor pattern is formed between the gate insulation film 162 and the source/drain electrodes 163 and 164.

Another insulation film 156 is formed on the protective film 152 including the first pixel electrode 155, and a second pixel electrode 157b of slit structure (or slit shape) is formed on this additional insulation film 156. The second pixel electrode 157b is electrically connected to the drain electrode of another thin film transistor TFT (not shown). In other words, one sub-pixel (i.e., the green sub-pixel G) may include two thin film transistors TFT. The thin film transistor TFT connected to the first pixel electrode 155 is turned on and off simultaneously with another thin film transistor TFT connected to the second pixel electrode 157b. This other thin film transistor TFT connected to the second pixel electrode 157b is formed simultaneously with the thin film transistor TFT connected to the first pixel electrode 155.

The electrophoretic film 130 includes a polymer and electronic ink capsules 137b and 139b within the polymer. The electronic ink within one capsule includes black ink 137b and white ink 139b. The black ink particles 137b and the white ink particles 139b are arranged (or distributed) in the grating (the diffraction grating) shape, as shown in FIG. 5. This results from the fact that, in the center of the common voltage on the common electrode 131, the electric potential difference on a region occupied with only first pixel electrode 155 is different from that on another region occupied with the stacked first and second pixel electrodes 155 and 157b.

In the green sub-pixel G of FIG. 5 as described above, the second pixel electrode 157b is formed to be slit in a second width d2 on the first pixel electrode 155.

Figure 6:
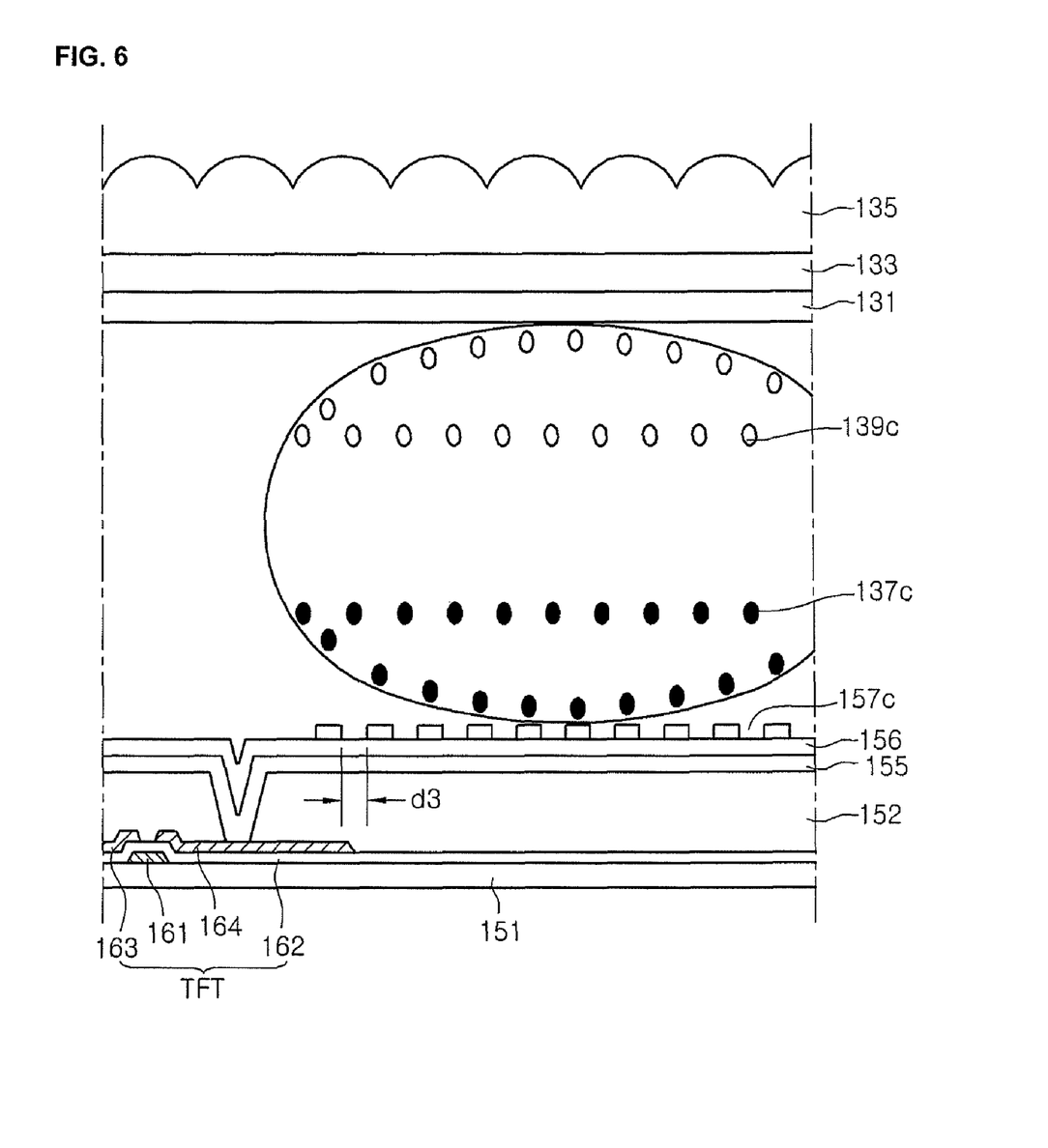
FIG. 6 is a cross-sectional view showing a blue sub-pixel according to an embodiment of the present disclosure.

FIG. 6 is a cross-sectional view showing a blue sub-pixel according to an embodiment of the present disclosure. As shown in FIG. 6, the blue sub-pixel B includes an electrophoretic film 130, an insulation film 133, and a light correction film 135 sequentially stacked on the lower substrate. The lower substrate includes a base film 151 on which two thin film transistors TFT are formed. A common electrode 131 is formed on the insulation film 133. The light correction film 135 changes light paths.

The lower substrate includes a gate electrode 161 formed on the base film 151. The base film 151 includes a gate insulation film 162 formed on its entire surface including the gate electrode 161. Also, source/drain electrodes 163 and 164 are formed on the gate insulation film 162.

There is a protective film 152 formed on the gate insulation film 162 including the source/drain electrodes 163 and 164, and the first pixel electrode 155 is formed on the protective film 152. The first pixel electrode 155 is formed to be electrically connected with the drain electrode 164 of the thin film transistor TFT. Although it is not shown in the drawing, a semiconductor pattern is formed between the gate insulation film 162 and the source/drain electrodes 163 and 164.

Another insulation film 156 is formed on the protective film 152 including the first pixel electrode 155, and a second pixel electrode 157c of slit structure (or slit shape) is formed on this additional insulation film 156. The second pixel electrode 157c is electrically connected to the drain electrode of another thin film transistor TFT (not shown). In other words, one sub-pixel (i.e., the blue sub-pixel B) may include two thin film transistors TFT. The thin film transistor TFT connected to the first pixel electrode 155 is turned on and off simultaneously with another thin film transistor TFT connected to the second pixel electrode 157c. This other thin film transistor TFT connected to the second pixel electrode 157c is formed simultaneously with the thin film transistor TFT connected to the first pixel electrode 155.

The electrophoretic film 130 includes a polymer and electronic ink capsules 137c and 139c within the polymer. The electronic ink within one capsule includes black ink 137c and white ink 139c. The black ink particles 137c and the white ink particles 139c are arranged (or distributed) in the grating (i.e., the diffraction grating) shape, as shown in FIG. 6. This results from the fact that, in the center of the common voltage on the common electrode 131, the electric potential difference on a region occupied with only first pixel electrode 155 is different from that on another region occupied with the stacked first and second pixel electrodes 155 and 157c.

In the blue sub-pixel B of FIG. 6 as described above, the second pixel electrode 157c is formed to be slit in a third width d3 on the first pixel electrode 155.

As shown in FIGS. 4 to 6, the structure of the electrophoretic display device according to the embodiment of the present disclosure is such that the first to third pixel electrodes 157a to 157c slit in first to third widths d1 to d3 are respectively on the first pixel electrodes 155 of the red, green, and blue sub-pixels R, G, and B. Therefore, the sub-pixels R, G, and B can reflect lights of fixed wavelength bands (i.e., red, green, and blue lights) when pulse-width-modulated data voltages and a constant positive or negative polarity voltage are applied to the first and second pixel electrodes 155 and 157a to 157c. As a result, the electrophoretic display device according to the embodiment of the present disclosure can display a variety of color images.

Figure 7:
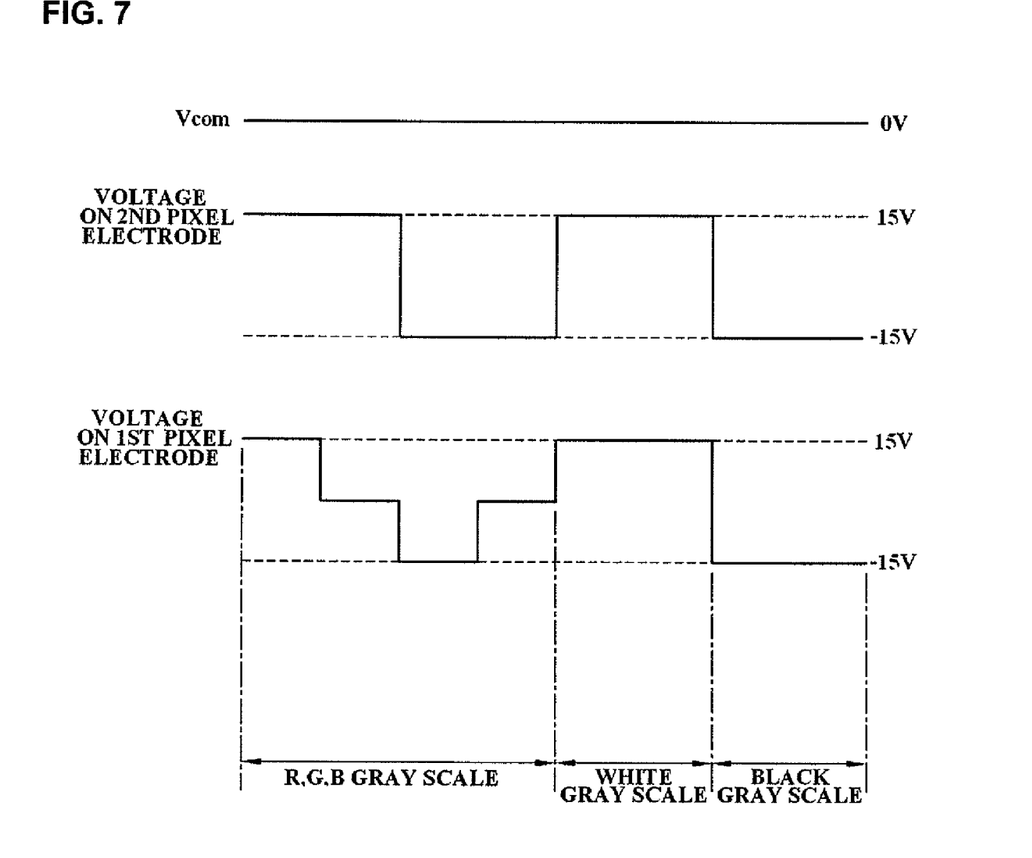
FIG. 7 is a waveform diagram showing drive voltage pulses according to an embodiment of the present disclosure.

FIG. 7 is a waveform diagram showing drive voltage pulses according to an embodiment of the present disclosure. The drive voltage pulses shown in FIG. 7 can be explained in an interval displaying R, G, and B gray scales, an interval displaying a white gray scale, and an interval displaying a black gray scale, for convenience of explanation.

In the interval displaying the R, G, and B gray scales, a common voltage Vcom according to the present embodiment is set at a reference voltage level of "0V". A positive polarity voltage of "15V" and a negative polarity voltage of "−15V" are sequentially applied to the slit second pixel electrode. On the other hand, the first pixel electrode 155 receives a pulse-width-modulated voltage which has a positive polarity voltage period of "15V", a middle level voltage period of "0V", and a negative polarity voltage period of "−15V". The pulse width of the positive polarity voltage (i.e., the positive polarity voltage period) applied to the first pixel electrode 155 may be modulated in accordance with a data signal for each pixel.

The common voltage Vcom maintains the reference voltage level of "0V" and a positive polarity voltage of "15V" is applied to the first pixel electrode 155, during the white gray scale display interval. Also, the second pixel electrode 157 receives a positive polarity voltage of "15V". Then, the white ink 139 included in all the sub-pixels is moved toward the light correction film 135, thereby displaying a white color in the corresponding pixel.

In the black gray scale display interval, the common voltage Vcom maintains the reference voltage level of "0V" while a negative polarity voltage of "15V" is applied to the first and second pixel electrodes 155 and 157. As such, the black ink 137 included in all the sub-pixels is moved toward the light correction film 135, thereby displaying a black color in the corresponding pixel.

Such an electrophoretic display device of the present embodiment includes second pixel electrodes, which are formed to be slit in different widths on the first electrodes of red, green, and blue sub-pixels. It pulse-width-modulates the data voltage applied to the first electrode. In accordance therewith, the white ink and the black ink within the polymer are separated from each other. Then, the white ink particles (or leptons) which are alternately arranged in the upper portion of the electronic ink capsules on the red, green, and blue pixel regions, function as a grating (i.e., a diffraction grating) and allow light of the fixed wavelength bands to be reflected, thereby displaying the red, green, and blue colors. Also, the electrophoretic display device of the present embodiment controls the vertical position deviation between the white ink particles and enables the intensity of each light color to be modulated (or adjusted), so that the gray scale scheme can be realized. Consequently, the electrophoretic display device of the present embodiment can eliminate the color filter substrate included in that of the related art. As a result, the electrophoretic display device according to the embodiment of the present disclosure can provide a simplified structure and a higher color reproduction index.

The electrophoretic display device according to the embodiment of the present disclosure displays images without the color filter substrate. This prevents the decrement of reflexibility due to the light leakage caused by the color filter substrate, and can improve the reliability of color reproduction.

Moreover, as the number of independently manufactured elements is decreased by eliminating the color filter substrate, the number of manufacturing and assembling steps is reduced. Therefore, the alignment defect may be prevented and the manufacturing costs can be cut down. Furthermore, the electrophoretic display device according to the embodiment of the present disclosure may be more light, thin, and flexible.

It will be apparent to those skilled in the art that various modifications and variations can be made in the present disclosure. Thus, it is intended that the present disclosure cover the modifications and variations of this embodiment provided they come within the scope of the appended claims and their equivalents.

The invention claimed is:

1. An electrophoretic display device comprising:
 a substrate including a plurality of pixels;
 a first pixel electrodes on the substrate;
 a second pixel electrodes to be slit on each first electrode; and
 an electrophoretic film disposed on the second pixel electrodes,
 wherein the pixel is included of a red sub-pixel, a green sub-pixel and a blue sub-pixel,
 wherein the second pixel electrodes on the red, green and blue sub-pixels are different from each other in width.

2. The electrophoretic display device of claim 1, wherein the slit width of the second pixel electrode for the green sub-pixel is wider than that for the blue sub-pixel and is narrower than that for the red sub-pixel.

3. The electrophoretic display device of claim 1, further comprising:
 first transistors including drain electrodes connected to each first pixel electrode; and
 second transistors including drains electrodes connected to each second pixel electrode.

4. The electrophoretic display device of claim 1, wherein each of the second pixel electrodes receives one of positive and negative polarity voltages having a fixed pulse width.

5. The electrophoretic display device of claim 1, wherein each of the first pixel electrodes receives a signal including a pulse-width-modulated positive polarity voltage, a negative polarity voltage, and a reference voltage.

6. The electrophoretic display device of claim 1, further comprising an insulation film, on the electrophoretic film, including a common electrode disposed thereon.

7. The electrophoretic display device of claim 6, further comprising a light correction film on the insulation film changing a light path to enlarge a viewing angle.

8. The electrophoretic display device of claim 7, wherein the light correction film includes an embossed pattern on its surface.

* * * * *